(12) United States Patent
Dong et al.

(10) Patent No.: US 10,795,101 B2
(45) Date of Patent: Oct. 6, 2020

(54) OPTICAL MODULE

(71) Applicant: Hisense Broadband Multimedia Technologies Co., Ltd., Qingdao, Shandong (CN)

(72) Inventors: Benzheng Dong, Shandong (CN); Jinlei Chen, Shandong (CN); Hongchao Pan, Shandong (CN)

(73) Assignee: Hisense Broadband Multimedia Technologies Co., Ltd., Qingdao, Shandong (CN)

(*) Notice: Subject to any disclaimer, the term of this patent is extended or adjusted under 35 U.S.C. 154(b) by 0 days.

(21) Appl. No.: 16/355,134

(22) Filed: Mar. 15, 2019

(65) Prior Publication Data
US 2019/0384023 A1  Dec. 19, 2019

Related U.S. Application Data

(63) Continuation of application No. PCT/CN2019/077755, filed on Mar. 12, 2019.

(30) Foreign Application Priority Data

Jun. 19, 2018 (CN) .......................... 2018 1 0632483

(51) Int. Cl.
*G02B 6/42* (2006.01)
*H04B 10/25* (2013.01)
(Continued)

(52) U.S. Cl.
CPC .......... *G02B 6/4261* (2013.01); *G02B 6/4246* (2013.01); *H01R 13/6275* (2013.01); *H01R 13/6335* (2013.01); *H04B 10/25* (2013.01)

(58) Field of Classification Search
CPC .. G02B 6/4201; G02B 6/4261; G02B 6/3893; G02B 6/4292; G02B 6/4246;
(Continued)

(56) References Cited

U.S. PATENT DOCUMENTS 7,374,347 B1* 5/2008 Oki ...................... G02B 6/4201
                                                                 385/88
7,955,003 B2* 6/2011 Teo ..................... H01R 13/6275
                                                                 385/88
(Continued)

FOREIGN PATENT DOCUMENTS

CN        202794619 U       3/2013
CN        205404903 U       7/2016
(Continued)

OTHER PUBLICATIONS

International Search Report dated May 20, 2019 for PCT Application No. PCT/CN2019/077755, Chinese language only (10 pp.).
(Continued)

*Primary Examiner* — Michael P Mooney
(74) *Attorney, Agent, or Firm* — Brinks Gilson & Lione

(57) ABSTRACT

Embodiments of the present disclosure relates to an optical module, including a bracket, and a handle and a plate both of which are connected to the bracket, where the plate is rotationally connected to the bracket, and a first end of the plate is provided with a buckle, and a second end of the plate abuts against a driving portion disposed on the handle, the driving portion is configured to: while the handle is moving along a length direction of the bracket, drive the second end of the plate that abuts against the driving portion to move, resulting in rotation of the buckle provided at the first end of the plate. On this basis, a lateral unlocking of the optical module is achieved along its length direction with a high unlocking reliability.

9 Claims, 7 Drawing Sheets

(51) Int. Cl.
*H01R 13/633* (2006.01)
*H01R 13/627* (2006.01)

(58) Field of Classification Search
CPC .... G02B 6/423; G02B 6/4255; G02B 6/4277; G02B 6/4284; G02B 6/428; H04B 10/25; H01R 13/6275; H01R 13/6335
USPC .................. 385/53, 88, 92, 135–139, 50, 77
See application file for complete search history.

(56) References Cited

U.S. PATENT DOCUMENTS

| | | | | |
|---|---|---|---|---|
| 9,219,333 B2 * | 12/2015 | Wang | ................ | H01R 13/6275 |
| 9,841,568 B2 * | 12/2017 | Wang | ................ | H01R 13/6335 |
| 10,451,819 B2 * | 10/2019 | Yizhi | ................ | G02B 6/3893 |

FOREIGN PATENT DOCUMENTS

| | | |
|---|---|---|
| CN | 205450360 U | 8/2016 |
| CN | 107102406 A | 8/2017 |
| CN | 206505205 U | 9/2017 |
| CN | 107797196 A | 3/2018 |
| CN | 108802920 A | 11/2018 |
| JP | 2008225134 A | 9/2008 |

OTHER PUBLICATIONS

Office Action dated Jun. 5, 2019 from the China Patent Office for Application No. 201810632483.5, Chinese language only (7 pp.).

* cited by examiner

OPTICAL MODULE

CROSS-REFERENCE TO RELATED APPLICATIONS

The present application is a continuation of International Application No. PCT/CN2019/077755, filed on Mar. 12, 2019 and entitled "Optical Module", which claims priority to Chinese Patent Application No. 201810632483.5, filed on Jun. 19, 2018 and entitled "Optical Module". The disclosures of the aforementioned applications are incorporated by reference herein in their entireties.

TECHNICAL FIELD

The present disclosure relates to optical communication technologies, and in particular, to an optical module.

BACKGROUND

A main function of an optical module is to realize photoelectric/electro-optical conversion. The optical module usually comprises an optoelectronic device, a functional circuit and an optical interface, and plays an important role in optical fiber communication system. According to package types, optical modules can be classified into Small Form-factor Pluggable (SFP) optical module and SFP+ optical module.

SUMMARY

The present disclosure provides an optical module to unlock the optical module with a high reliability.

In a first aspect, the present disclosure provides an optical module, including:

a bracket, and a handle and a plate both of which are connected to the bracket, the plate is rotationally connected to the bracket, and a first end of the plate is provided with a buckle, and a second end of the plate abuts against a driving portion disposed on the handle, the driving portion is configured to: while the handle is moving along a length direction of the bracket, drive the second end of the plate that abuts against the driving portion to move, resulting in rotation of the buckle provided at the first end of the plate.

In some implementation of the present disclosure, the plate comprises a connecting portion and a locking portion, the connecting portion and the locking portion are respectively disposed at two ends of the plate, a first rotating portion is provided between the connecting portion and the locking portion, and the first rotating portion is rotationally connected to a second rotating portion provided on the bracket.

In some implementation of the present disclosure, a chute is disposed on a first side of the connecting portion facing the handle, and the driving portion abuts against the chute, the driving portion is configured to: while the handle is moving outward along the length direction of the bracket, the driving portion movable along the chute drives the connecting portion to rotate along the direction away from the handle.

In some implementation of the present disclosure, a height dimension of the chute gradually reduces along the handle's outward move direction.

In some implementation of the present disclosure, the buckle is disposed on the locking portion, and a latch in a cage for receiving the optical module is configured for snapping into the buckle.

In some implementation of the present disclosure, a covering board is further included, the covering board is above the plate and covers the plate, and the covering board includes a connecting board and a pressure board, the connecting board is connected to the bracket, the pressure board is engaged with the connecting portion, and the pressure board is configured to drive the connecting portion to rotate in a direction toward the handle while the connecting portion is driven by the driving portion.

In some implementation of the present disclosure, the bracket is provided with a groove for receiving the buckle, the groove is configured to: receive the buckle that is retracted when the connecting portion rotates in the direction away from the handle.

In some implementation of the present disclosure, the handle is provided with a hook, and the bracket is provided with a spring, the spring is arranged along the length direction of the bracket, wherein a first end of the spring abuts against the bracket, and the second end thereof abuts against the hook, the spring is configured to flex along the length direction of the bracket when the handle is moving outward along the length direction of the bracket.

In some implementation of the present disclosure, the bracket is provided with a stopped portion, and the handle is provided with a stopped chute; or the bracket is provided with a stopped chute, and the handle is provided with a stopped portion, the stopped portion and the limiting chute are configured to connect with to each other to restrict a moving stroke of the handle along the length direction of the bracket.

In some implementation of the present disclosure, the first rotating portion is a rotating shaft, the second rotating portion is a hole; or the first rotating portion is a hole, the second rotating portion is a rotating shaft, the hole and the rotating shaft are configured to joint, such that the plate is rotatably connected to the bracket.

BRIEF DESCRIPTION OF THE DRAWINGS

The accompanying drawings herein are incorporated into and constitute a part of the specification, illustrate embodiments of the present disclosure, and are intended to explain principles of the present disclosure together with the description.

Figure 1:
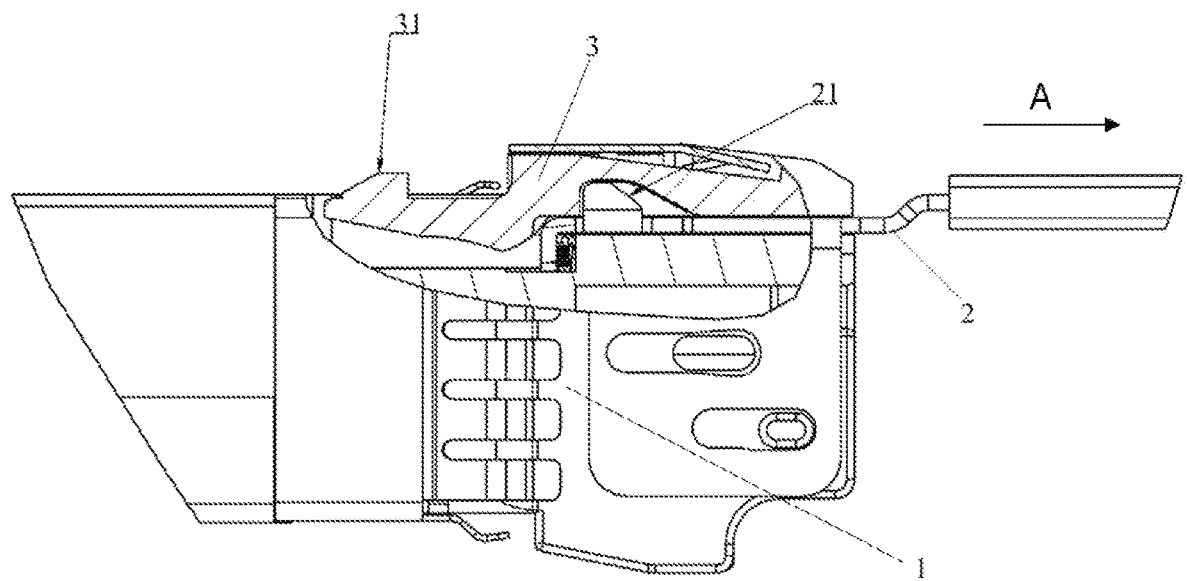
FIG. 1 shows a schematic structural view of an optical module according to some examples of the present disclosure.

DESCRIPTION OF THE REFERENCE SIGNS 1 bracket;
11 second rotating portion;
12 groove;
13 stopped portion;
2 handle;
21 driving portion;
22 hook;
23 stopped chute;
231 step;
24 bend;
25 pull rod;
251 through hole;
252 protrusion;
3 plate;
31 buckle;
32 connecting portion;
33 locking portion;
34 first rotating portion;
35 chute;
4 covering board;
41 connecting plate;
42 pressure plate; and
5 spring.

The specific embodiments of the present disclosure are discussed with reference to the above-described drawings, and will be described in more detail below. The drawings and the description are not intended to limit the scope of the present disclosure in any way, and the concepts of the present disclosure will be described for those skilled in the art with reference to the specific embodiments.

DETAILED DESCRIPTION OF THE EMBODIMENTS

Exemplary embodiments will be described in detail herein, examples of which are illustrated in the accompanying drawings. When the following description refers to the accompanying drawings, same numerals in different figures represents same or similar element unless otherwise indicated. The implementations described in the following exemplary embodiments do not represent all embodiments of the present disclosure. Instead, they are merely examples of apparatuses and methods consistent with aspects of the present disclosure as detailed in the appended claims.

In the description of the present disclosure, it should be understood that orientation or positional relationship indicated by terms "above", "below", "front", "rear", "left", "right" and the like is based on orientation or positional relationship shown in the drawings. The orientation or the positional relationship is merely for purpose of describing the present disclosure and the simplified description, and is not intended to indicate or imply that the apparatus or element referred to as a specific orientation, is constructed and operated in a specific orientation, and therefore is not to be construed as limiting the present disclosure.

In the present disclosure, unless explicitly stated and defined otherwise, the terms "installation", "jointed", "connected", "fixed" and the like shall be understood broadly. For example, it may be either a fixed connection or a detachable connection, or may be integrated; may be directly connected, or may be indirectly connected through an intermediate medium, may be an internal communication between two elements or an interaction of two elements, unless explicitly defined otherwise. For those skilled in the art, specific meanings of the above terms in the present disclosure can be understood on a case-by-case basis.

In the present disclosure, unless otherwise explicitly stated and defined, a first feature being "above" or "below" a second feature may be that the first and second features directly contact with each other, or the first and second features may be indirectly contact through an intermediate medium. Moreover, the first feature being "on top of", "above" and "on upside of" the second feature may be that the first feature is directly above or obliquely above the second feature, or merely represent that a level of the first feature is higher than that of the second feature. The first feature being "beneath", "below" and "under" the second feature may be that the first feature is directly below or obliquely below the second feature, or merely represent that the level of the first feature is less than that of the second feature.

A brief description about application scenarios involved in the present disclosure is given.

The structure of the optical module of the present disclosure is applied to an SFP and an SFP+optical module. This kind of the optical module is hot-pluggable, that is, the optical module is capable of connecting to or disconnecting from a device without turning off the power source. Since the optical module is usually inserted or removed during use, the optical module generally is provided with an unlocking mechanism that allows the optical module to smoothly disengage from a cage on a system board. A handle is usually rotated to rotate a plate to unlock the optical module. This manner requires a larger rotation angle to unlock. While unlocking, it is necessary for the handle to be pulled up for a large angle to move the plate into position to achieve unlocking. Otherwise, it cannot be unlocked, and cause damage to the plate or cage.

The technical scheme of the present disclosure will be described in detail below with specific embodiments. The following specific embodiments may be combined with each other, and the same or similar concepts or processes may not be described in some embodiments.

FIG. 1 shows a schematic structural view of an optical module according to some examples of the present disclosure. As shown in FIG. 1, the optical module of this embodiment includes:

a bracket 1, and a handle 2 and a plate 3 both of which are in connection with the bracket 1, where the plate 3 is rotationally connected to the bracket 1, and a first end of the plate 3 is provided with a buckle 31, and a second end of the plate 3 abuts against the driving portion 21 disposed on the handle 2. The driving portion 21 is configured to: while the handle 2 is moving along a length of the bracket 1, drive the second end of the plate 3 that abuts against the driving portion 21 to move to cause the plate 3 rotate and the buckle 31 provided at the first end of the plate 3 rotate due to the rotation of the plate 3.

In particular, the handle 2 is connected to the bracket 1, a first end of the handle 2 is provided with the driving portion 21, and the driving portion 21 is abutted against the second end of the plate 3, the first end of the plate 3 is provided with the buckle 31 for locking the optical module with a cage on a system board. When the handle 2 is pulled, that is, when the handle 2 is moving along the length direction of the bracket 1, the driving portion 21 that abuts against the second end of the plate 3 rotates, resulting rotating towards a direction away from the handle 2, thereby causing the buckle 31 provided at the first end of the plate 3 to rotate, and thus the optical module is unlocked, that is, the buckle 31 of the plate 3 is separated from a latch of the cage.

The length direction of the bracket 1 is a direction indicated by direction A in FIG. 1.

Figure 2:
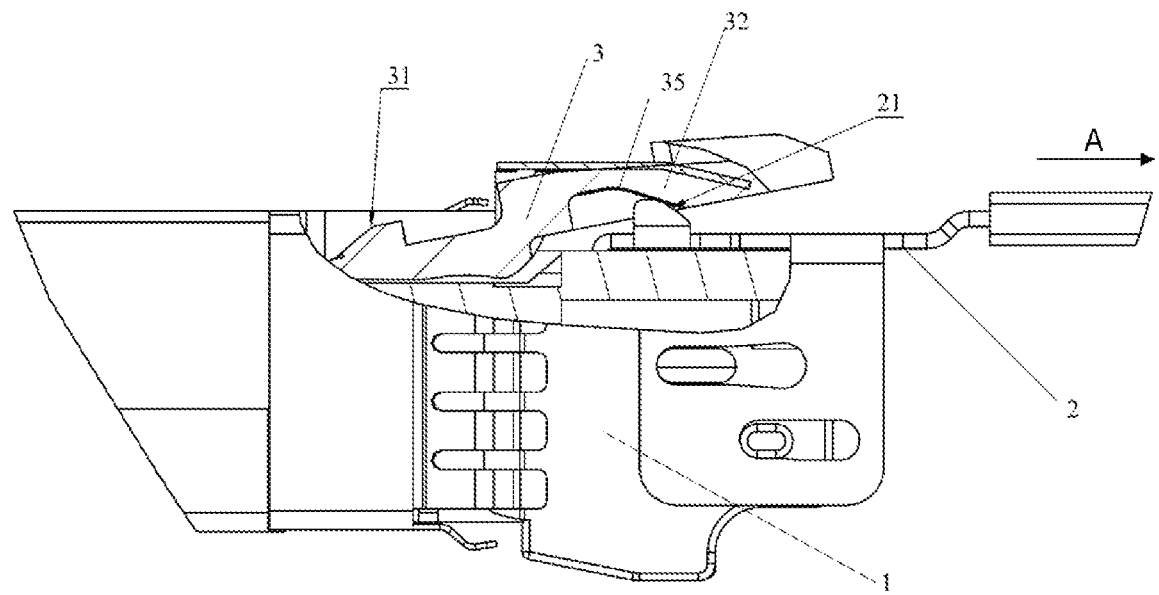
FIG. 2 shows another schematic structural view of an optical module according to some examples of the present disclosure.

As shown in FIG. 1 and FIG. 2, FIG. 1 shows a schematic structural view of the optical module when it is locked within the cage, and FIG. 2 shows a schematic structural view of the optical module when it is unlocked from the cage. When the handle 2 is pulled outward along the length direction of the bracket 1 to move (i.e., along the direction indicated by A in FIG. 1), the second end of the plate 3 that abuts the driving portion 21 of the handle 2 is jacked up, so that the buckle 31 of the plate 3 sinks, thereby causing the buckle 31 of the plate 3 separate from the latch of the cage to achieve unlocking.

The optical module of this embodiment includes: the bracket, and the handle and the plate which are connected to the bracket, where the plate is rotationally connected to the bracket, and a first end of the plate is provided with the buckle, and a second end of the plate abuts against the driving portion disposed on the handle, wherein the driving portion is configured to: when the handle is moving along the length direction of the bracket, drive the second end of the plate that abuts against the driving portion to rotate, so that the buckle provided at the second end of the plate rotates. By moving the handle along the length direction of the bracket, the driving portion of the handle drives the second end of the plate that abuts against the driving portion to rotate, which causes the buckle disposed at the first end of the plate rotates, thereby achieving a lateral unlocking of the optical module along its length direction with a high reliability. By pulling the handle to drive the plate, the buckle provided at the first end of the plate detaches from the cage, thereby achieving a self-unlocking of the optical module within the cage.

Figure 3:
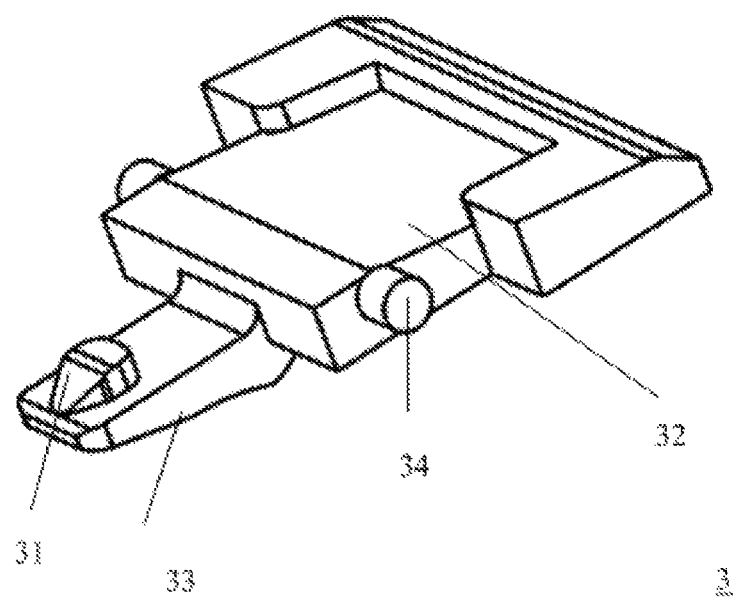
FIG. 3 shows a schematic structural view of a plate of an optical module according to some examples of the present disclosure.
Figure 4:
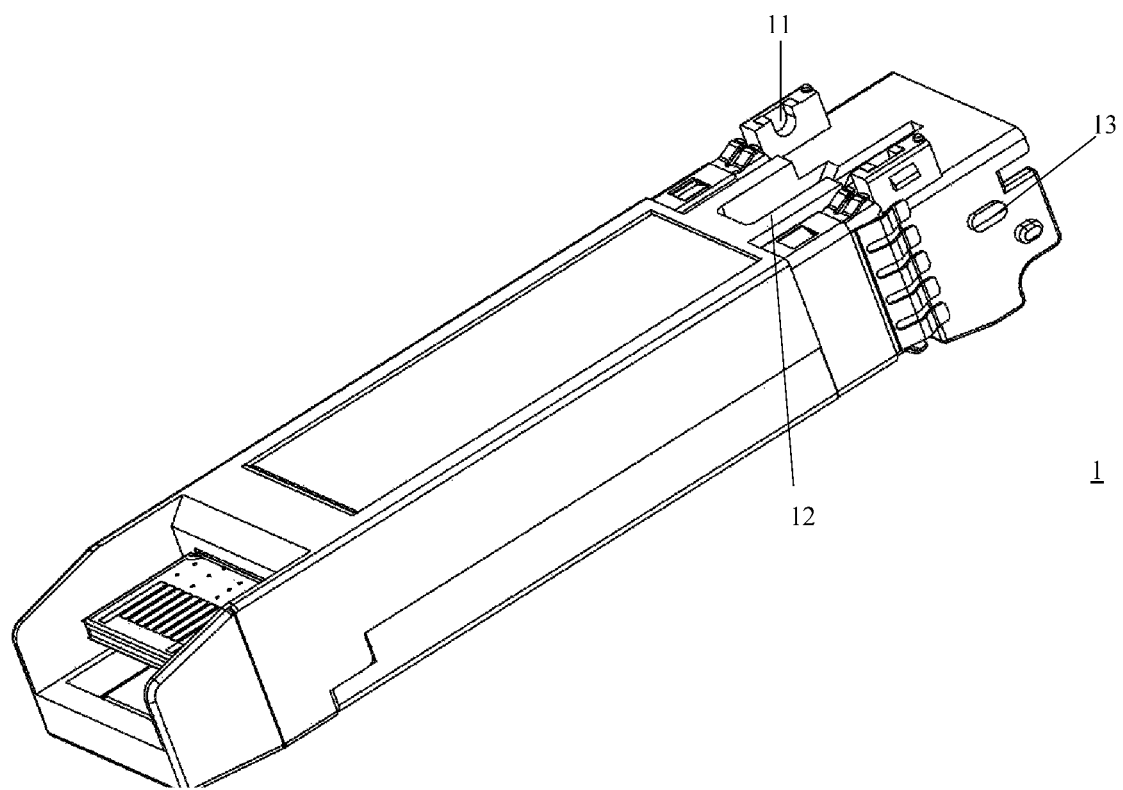
FIG. 4 shows a schematic structural view of a bracket of an optical module according to some examples of the present disclosure.

On the basis of the above embodiment, in order to realize the rotation of the plate, as shown in FIGS. 3 and 4, the plate 3 includes a connecting portion 32 and a locking portion 33, and the connecting portion 32 and the locking portion 33 are respectively provided at two ends of the plate 3, a first rotating portion 34 is provided between the connecting portion 32 and the locking portion 33, and the first rotating portion 34 is rotationally connected to a second rotating portion 11 provided on the bracket 1.

Specifically, the first rotating portion 34 of the plate 3 is rotationally connected to the second rotating portion 11 provided on the bracket 1. The specific structures of the first rotating portion 34 and the second rotating portion 11 will be discussed further below.

The first rotating portion 34 is in the form of a rotating shaft, the second rotating portion 11 is in the form of a hole; or the first rotating portion 34 is in the form of a hole, the second rotating portion 11 is in the form of a rotating shaft, the hole and the rotating shaft are configured to connect such that the plate 3 is rotatably connected to the bracket 1.

FIGS. 3 and 4 show a structure where the first rotating portion 34 is a rotating shaft and the second rotating portion 11 is a hole.

The buckle 31 is disposed on the locking portion 33, and is configured for snapping into the latch of the cage for receiving the optical module.

As shown in FIG. 2 and FIG. 4, the bracket 1 is provided with a groove 12 for receiving the buckle 31. The groove 12 is configured to: while the connecting portion 32 is rotating in the direction away from the handle 2, receive the retracted buckle 31.

Specifically, when the handle 2 is moving outward in the length direction of the bracket 1, and the connecting portion 32 rotates in the direction away from the handle 2, the buckle 31 is retracted into the groove 12 of the bracket 1.

Figure 5:
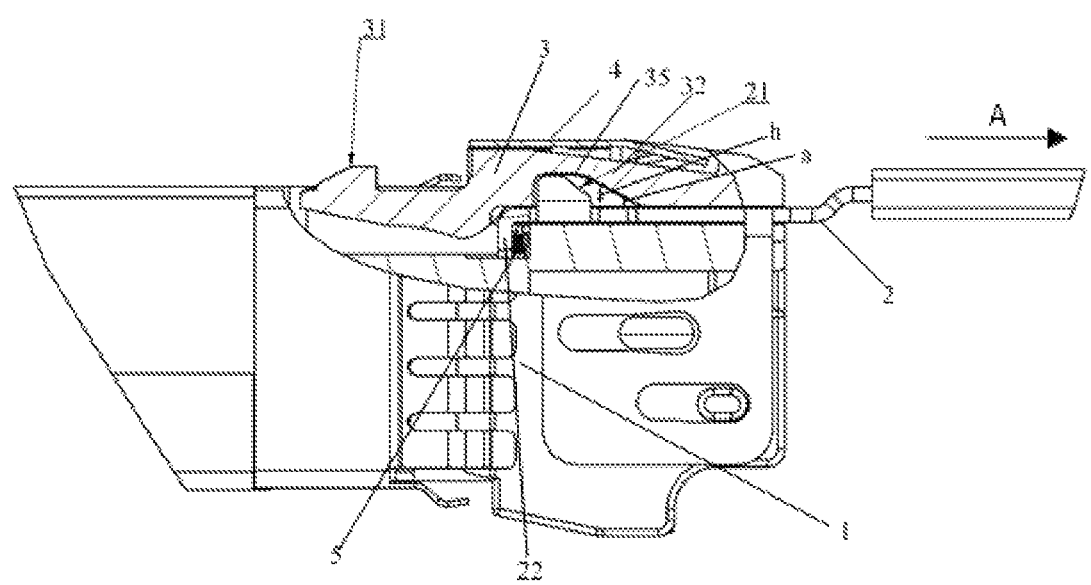
FIG. 5 shows another schematic structural view of an optical module according to some examples of the present disclosure.

Further, as shown in FIG. 2 and FIG. 5, a chute 35 is disposed on one side of the connecting portion 32 facing the handle 2, and the driving portion 21 abuts against the chute 35. The driving portion 21 is configured to: when the handle 2 is moving outward along the length direction A of the bracket 1, drive the connecting portion 32 while the driving portion moving in the chute 35 to rotate, so that the connecting portion 32 rotates along the direction away from the handle 2.

Specifically, the chute 35 is configured for accommodating the driving portion 21 of the handle 2, and the driving portion 21 abuts against the chute 35. When the handle 2 is moving outward along the length direction A of the bracket 1 (i.e., moving along the direction indicated by the arrow), the driving portion 21 moving along the chute 35 drives the connecting portion 32 to rotate, so that the connecting portion 32 rotates along the direction away from the handle 2.

Further, as shown in FIG. 5, a height dimension h of the chute 35 gradually reduces in a direction in which the handle 2 is moving outward along the length direction A of the bracket 1.

The height dimension of the chute 35 is a depth dimension of the chute 35.

Specifically, a description about the principle for unlocking is provided below.

As shown in FIG. 2 and FIG. 5, FIG. 5 is a schematic structural view in a locked state, and FIG. 2 is a schematic structural view in an unlocked state. When unlocking the optical module, the handle 2 is moving outward along the direction A (i.e., along the direction indicated by the arrow in FIGS. 2 and 5), a starting phase of a unlocking track of the driving portion 21 of the handle 2 contacting the plate 3 is a straight line, that is, the height dimension h of the chute 35 is unchanged, and the unlocking is not performed at this stage, which prevents unlocking from occurring in a short distance, and avoids unlocking accidently. The unlocking process is focused on the second half of the unlocking track (FIG. 2) to reduce unlocking due to an accident. The second half of the unlocking stroke converts a linear movement of the handle 2 into the rotational motion of the plate 3 based on a lever principle. Since the height dimension h of the chute 35 is gradually reduced, the rotation of the connecting portion 32 is achieved as a result of being raised up by the driving portion 21, thereby driving the buckle 31 at the other end of the plate 3 to rotate.

In the above embodiment, the plate 3 has a first rotating portion 34, which is jointed with the second rotating portion 11 of the bracket 1 to facilitate the rotation of the plate 3 during the unlocking process. The driving portion 21 of the handle 2 abuts against the chute 35 of the plate. When the handle 2 is moving outward along the length direction A of the bracket 1, the driving portion 21 movable along the chute 35 drives the connecting portion 32 to rotate, such that the connecting portion 32 rotates along the direction away from the handle 2, which causes the buckle 31 of the plate 3 detach from the latch of the cage, unlocking the optical module from the cage.

Figure 6:
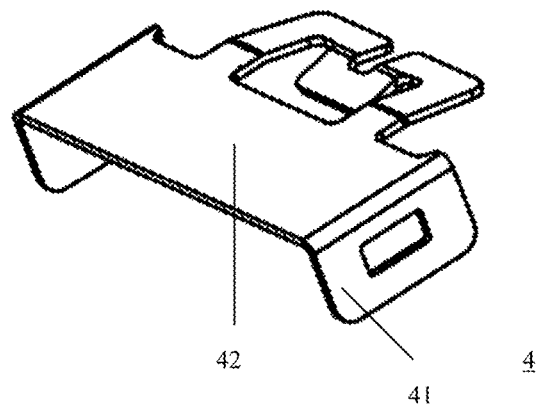
FIG. 6 shows a schematic structural view of a covering board of an optical module according to some examples of the present disclosure.

On the basis of the above embodiments, further, in order to prevent the plate from being removed from the optical module during the rotation, the plate is reset in the height direction, as shown in FIGS. 5 and 6, the optical module of this embodiment further includes:

a covering board 4 above the plate and configured for covering the plate 3, and including a connecting board 41 and a pressure board 42, wherein the connecting board 41 is connected to the bracket 1, the pressure board 42 is engaged with the connecting portion 32, and the pressure board 42 is configured to drive the connecting portion 32 to rotate in a direction toward the handle 2 when the connecting portion 32 is driven by the driving portion 21 to rotate.

Specifically, the covering board 4 is provided above the plate 3, and is fixed to the bracket 1 through the connecting boards 41 on both sides. The pressure board 42 of the covering board 4 is configured for driving the connecting portion 32 to rotate in a direction toward the handle 2 when the connecting portion 32 is driven by the driving portion 21 to rotate. That is, the covering board functions to reset the plate 3 in the height direction.

Further, in order to reset the plate in the length direction, as shown in FIG. 5, the handle 2 is provided with a hook 22, and the bracket 1 is provided with a spring 5, the spring 5 is arranged along the length direction A of the bracket 1, one end of the spring 5 abuts against the bracket 1, and the other end thereof abuts against the hook 22, and the spring 5 is configured for being compressed along the length direction A of the bracket 1 when the handle 2 is moving outward along the length direction A of the bracket 1.

Specifically, one end of the spring 5 abuts against the bracket 1, and the other end abuts against the hook 2 on the handle 2, and the spring 5 is compressed along the length direction of the bracket 1 and is deformed as the handle 2 is moving outward along the length direction A of the bracket 1. When the pull for the handle 2 is suspended upon the optical module being unlocked, the spring 5 recovers to its original state, which allows the handle 2 return to its original position and the plate 3 reset in the length direction after the optical module is unlocked.

The bracket 1 may be provided with a groove (not shown) for the hook 22 to slide, and when the handle 2 is moving outward along the length direction A of the bracket 1, the hook 22 is able to slide in the groove.

In the above embodiment, the covering board 4 is disposed above the plate 3 and fixed to the bracket 1 through the connecting boards 41 on both sides, and the covering board 4 is utilized to realize the resetting of the plate 3 in the height direction. Further, the arrangement of the spring 5 allows the handle 2 to automatically return to its original position after the unlocking is completed.

Figure 7:
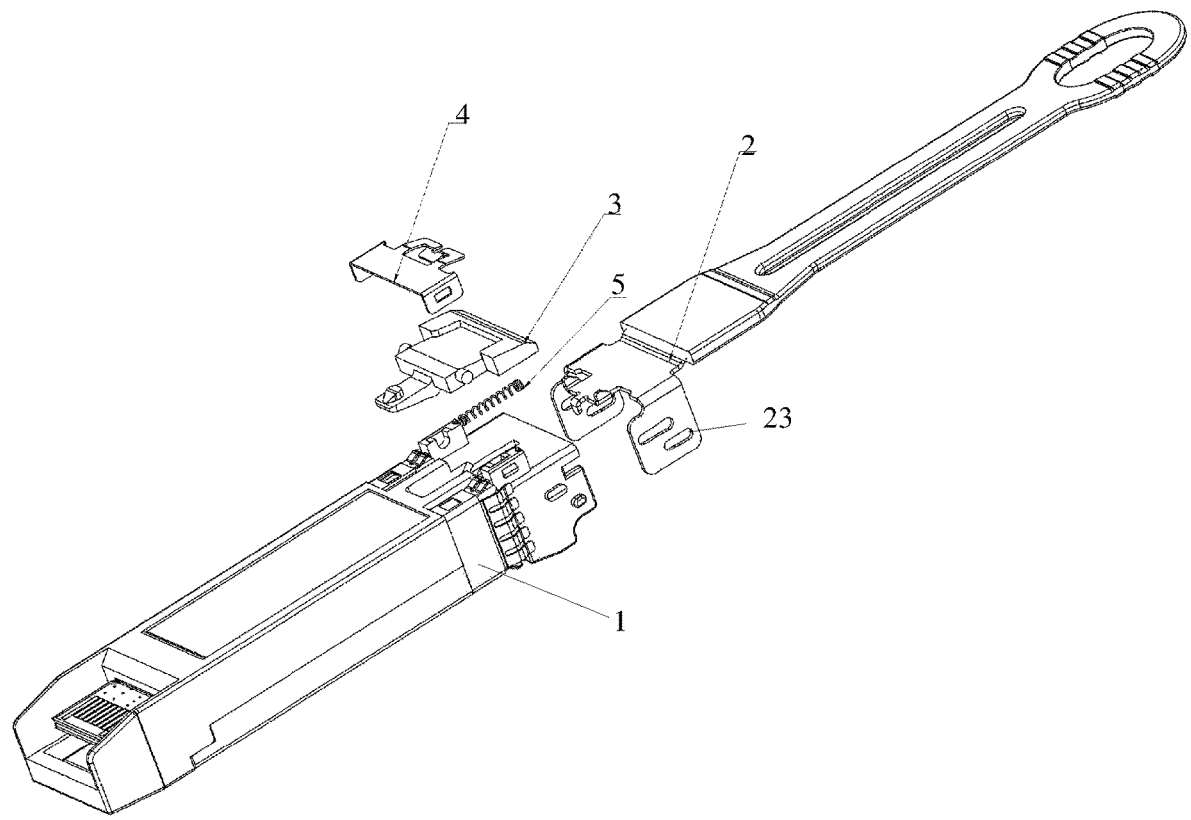
FIG. 7 shows an exploded view of an optical module according to some examples of the present disclosure.

On the basis of the above embodiment, as shown in FIG. 4 and FIG. 7, the bracket 1 is provided with a stopped portion 13, and the handle 2 is provided with a stopped chute 23; or the bracket 1 is provided with the stopped chute, and the handle 2 is provided with the stopped portion, the stopped portion and the stopped chute are configured to be connected to each other to limit the moving path of the handle 2 along the length direction A of the bracket 1.

Specifically, FIG. 4 and FIG. 7 show an example where the bracket 1 is provided with the stopped portion 13, and the handle 2 is provided with the stopped chute 23.

Figure 8:
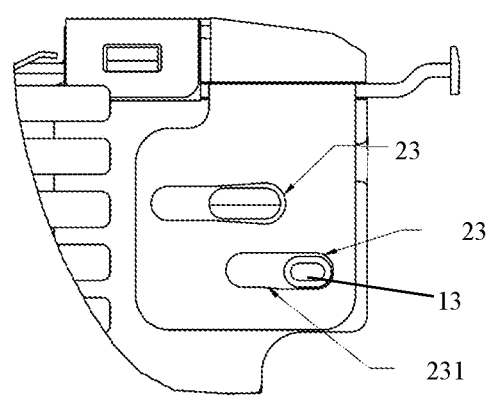
FIG. 8 shows a partial schematic view 1 of an optical module according to some examples of the present disclosure.
Figure 9:
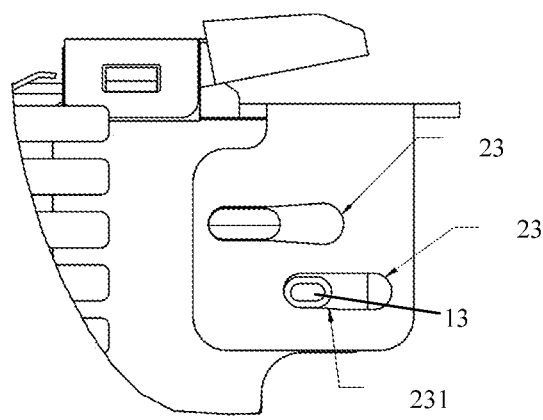
FIG. 9 shows a partial schematic view 2 of an optical module according to some examples of the present disclosure.

The handle 2 is connected to the bracket 1 of the optical module through the side boards disposed on both sides. The side board is provided with the stopped chute 23, which is sleeved on the stopped portion 13 of the bracket 1, as shown in FIG. 8 and FIG. 9. During the outward movement of the handle 2 along the length direction A of the bracket 1, the stopped chute 23 and the stopped portion 13 of the bracket 1 move relative to each other. FIG. 8 is a schematic view showing the positions of the stopped chute 23 and the stopped portion 13 when the optical module is in the locked state, and FIG. 9 is a schematic view showing the positions of the stopped chute 23 and the stopped portion 13 when the optical module is in the unlocked state.

The number of the stopped chutes 23 shown in FIG. 8 and FIG. 9 is two, and one or more than two may be provided in the other embodiments of the present disclosure, which is not limited in the present disclosure.

A diameter of the stopped chute 23 gradually increases along the length direction A of the bracket 1; a side of the stopped chute 23 along the length direction A is provided with a step 231.

Specifically, the stopped chute 23 has a structure where a front portion is larger than the rear portion. When the optical module is in the locked state, a diameter of a hole sleeved on the stopped portion 13 of the bracket 1 is larger, and when the optical module is in the unlocked state, the diameter of the hole sleeved on the stopped portion 13 of the bracket 1 is smaller. The purpose for the front portion being larger than the rear portion is to facilitate the installation, and the purpose for the rear portion being smaller than the front portion is to prevent the handle 2 from rotating, which in turn reduce a rotation gap.

As shown in FIG. 8 and FIG. 9, a side surface of the limiting chute 23 is provided with a sloped surface to form the step for reducing the rotation gap during the movement of the handle.

In the above specific embodiment, the bracket 1 is provided with a stopped portion 13, and the handle 2 is provided with stopped chute 23; or the bracket 1 is provided with a stopped chute, and the handle 2 is provided with a stopped portion, the stopped portion and the limiting chute are connected such that the moving stroke of the handle 2 along the length direction A of the bracket 1 is restricted, the problem that the unlock path is not enough due to the rotation of the handle is avoided.

Figure 10:
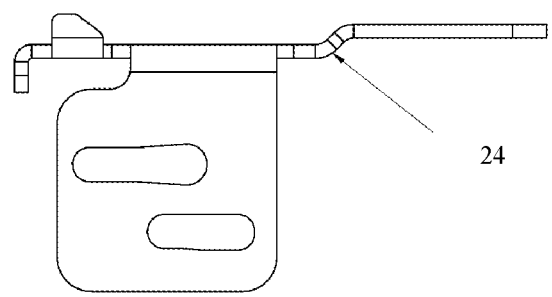
FIG. 10 shows a side view of a handle of an optical module according to some examples of the present disclosure.

On the basis of the above embodiments, optionally, as shown in FIG. 10, the handle comprises:

a bend 24 is provided in the middle of the handle 2.

Figure 11:
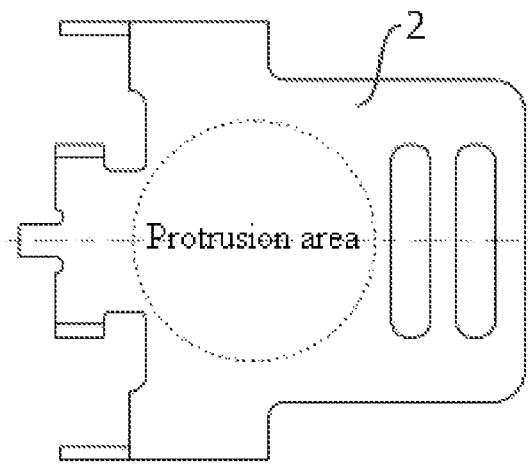
FIG. 11 shows a partial top structural view of FIG. 10.

Specifically, the handle 2 is made of sheet metal parts, and the sheet metal parts have a tendency to deformed and bulge during the processing. As shown in FIG. 11, which shows exemplary protrusion area, upon deformation, the protrusion would cause a height of the locking portion 33 (and the buckle 31) of the plate 3 reduce, and increase a risk of being unable to lock. In order to solve this problem, in a large flat area of the body of the handle 2, a bend 24 is added in an area not in contact with plate 3 to reduce the potential risk.

Further, a pull rod 25 of the handle 2 is provided with a through hole 251 along the length direction.

Figure 12:
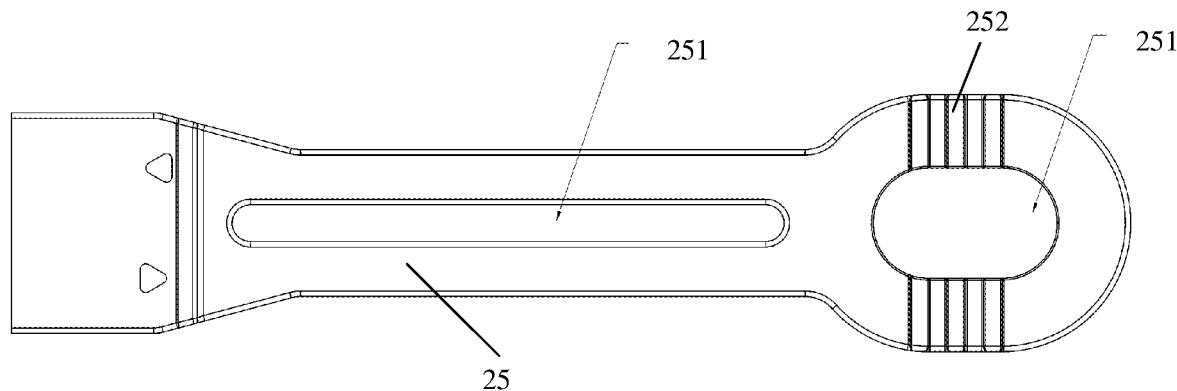
FIG. 12 shows a top view of a pull rod of a handle of an optical module according to some examples of the present disclosure.

As shown in FIG. 12, the pull rod 25 of the handle 2 is hollow, that is, provided with the through hole 251 along the length direction, and the shape of the through hole 251 is matched with that of the pull rod 25. The arrangement of through hole 251 allows the pull rod 25 of the handle 2 withstand a larger pulling force in a stretching direction, a relatively smaller bearing force (compared with the pulling force) in a compression direction (opposite to the direction indicated by the arrow), and easily deform without being broken.

As shown in FIG. 12, two through holes 251 are provided.

Figure 13:
FIG. 13 shows a side structural view of FIG. 12.

Further, in order to avoid slippage during the pulling process of the handle 2, as shown in FIGS. 12 and 13, a tail portion of the pull rod 25 of the handle 2 is provided with at least one row of protrusions 252.

Specifically, the tail portion of the pull rod 25 of the handle 2 is provided with the protrusion 252 (or a friction step) at a finger holding portion to increase a friction force, so that slipping is less likely to occur during the unlocking process.

Further, the tail portion of the pull rod 25 of the handle 2 has a rubberized sleeve.

The rubberized sleeve may be made of Thermoplastic Vulcanizate (TPV).

TPV is also known as polyolefin alloy thermoplastic elastomer. TPV has good elasticity and compression resistance; it has a wide application temperature range and wide range of softness and hardness; it can be processed by thermoplastic processing methods such as injection molding, extrusion and the like; and it is green and recyclable.

Figure 14:
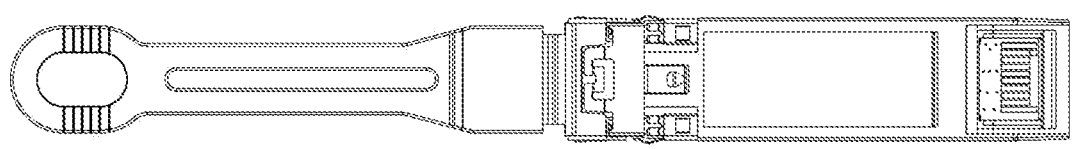
FIG. 14 shows a schematic top structural view of an optical module according to some examples of the present disclosure.
Figure 15:
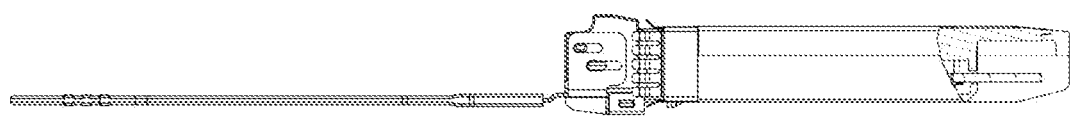
FIG. 15 shows a side structural view of FIG. 14.

FIG. 14 is a top view of the optical module, and FIG. 15 is a side view of the structure shown in FIG. 14.

Other embodiments of the present disclosure will be easily envisaged for those skilled in the art after considering the specification and practicing the disclosure disclosed herein. The present disclosure is intended to cover any variations, usages, or adaptive variations of the present disclosure, which are in accordance with the general principles of the present disclosure and include the common general knowledge or customary technical means in the art that are not disclosed in the present disclosure. The specification and embodiments are to be regarded as illustrative only, and the actual scope and spirit of the present disclosure is pointed out by the following claims.

It should be understood that the present disclosure is not limited to the precise structures that have been described above and shown in the drawings, and various modifications and variations may be made without departing from the scope thereof. The scope of the present disclosure is to be limited only by the appended claims.

What is claimed is:

1. An optical module, comprising:
a bracket, and a handle and a plate both of which are connected to the bracket,
wherein the plate is rotationally connected to the bracket, and a first end of the plate is provided with a buckle, and a second end of the plate abuts against a driving portion disposed on the handle, the driving portion is configured to: while the handle is moving along a length direction of the bracket, drive the second end of the plate that abuts against the driving portion to move, resulting in rotation of the buckle provided at the first end of the plate, and
wherein the bracket is provided with a stopped portion, and the handle is provided with a stopped chute; or the bracket is provided with a stopped chute, and the handle is provided with a stopped portion, the stopped portion and the limiting chute are configured to connect with to each other to restrict a moving stroke of the handle along the length direction of the bracket.

2. The optical module according to claim 1, wherein the plate comprises a connecting portion and a locking portion, the connecting portion and the locking portion are respectively disposed at two ends of the plate, a first rotating portion is provided between the connecting portion and the locking portion, and the first rotating portion is rotationally connected to a second rotating portion provided on the bracket.

3. The optical module according to claim 2, wherein a chute is disposed on a first side of the connecting portion facing the handle, and the driving portion abuts against the chute, the driving portion is configured to: while the handle is moving outward along the length direction of the bracket, the driving portion movable along the chute drives the connecting portion to rotate along the direction away from the handle.

4. The optical module according to claim 3, wherein a height dimension of the chute gradually reduces along the handle's outward move direction.

5. The optical module according to claim 2, wherein the buckle is disposed on the locking portion, and a latch in a cage for receiving the optical module is configured for snapping into the buckle.

6. The optical module according to claim 2, further comprising a covering board above the plate and covering the plate, and comprising a connecting board and a pressure board, the connecting board is connected to the bracket, the pressure board is engaged with the connecting portion, and the pressure board is configured to drive the connecting portion to rotate in a direction toward the handle while the connecting portion is driven by the driving portion.

7. The optical module according to claim 2, wherein the bracket is provided with a groove for receiving the buckle, the groove is configured to:
receive the buckle that is retracted when the connecting portion rotates in the direction away from the handle.

8. The optical module according to claim 1, wherein the handle is provided with a hook, and the bracket is provided with a spring, the spring is arranged along the length direction of the bracket, wherein a first end of the spring abuts against the bracket, and the second end thereof abuts against the hook, the spring is configured to flex along the length direction of the bracket when the handle is moving outward along the length direction of the bracket.

9. The optical module according to claim 2, wherein the first rotating portion is a rotating shaft, the second rotating portion is a hole; or the first rotating portion is a hole, the second rotating portion is a rotating shaft, the hole and the rotating shaft are configured to joint, such that the plate is rotatably connected to the bracket.

* * * * *